No. 855,623.

PATENTED JUNE 4, 1907.

H. B. EMERSON.
MOTOR CONTROL.
APPLICATION FILED OCT. 17, 1906.

2 SHEETS—SHEET 1.

Witnesses
Irving E. Steers
Helen Alford

Inventor
Henry B. Emerson,
by Albert G. Davis
Att'y.

No. 855,623. PATENTED JUNE 4, 1907.
H. B. EMERSON.
MOTOR CONTROL.
APPLICATION FILED OCT. 17, 1906.

2 SHEETS—SHEET 2.

Witnesses
Irving E. Steers.
Helen Oxford

Inventor
Henry B. Emerson,
by Albert G. Davis
Att'y.

UNITED STATES PATENT OFFICE.

HENRY B. EMERSON, OF SCHENECTADY, NEW YORK, ASSIGNOR TO GENERAL ELECTRIC COMPANY, A CORPORATION OF NEW YORK.

MOTOR CONTROL.

No. 855,623.

Specification of Letters Patent.

Patented June 4, 1907.

Application filed October 17, 1906. Serial No. 339,323.

*To all whom it may concern:*

Be it known that I, HENRY B. EMERSON, a citizen of the United States, residing at Schenectady, county of Schenectady, State of New York, have invented certain new and useful Improvements in Motor Control, of which the following is a specification.

My invention relates to the control of motor-driven devices, such as printing-presses, which must be operated at widely varying speeds.

It has been proposed heretofore to employ two motors for driving printing-presses and similar machinery, one motor being of small capacity connected to the load through low-speed gearing, and the other a larger motor connected to the load through high-speed gearing. With such an arrangement it is ordinarily necessary to provide means for mechanically disconnecting the smaller motor from the load when the load is being driven by the larger motor.

My invention comprises a novel arrangement of the motors and gearing and of the motor-control, whereby both motors may be mechanically connected to the load at all times. To this end I provide a differential gear having two of its members connected to the two motors, respectively, and the third to the load; the gearing being so arranged as to give a load-speed of zero when the small motor is operating at its maximum, and the larger motor at its minimum, speed. I provide controlling means for bringing the motors up to their maximum and minimum speeds, respectively; then gradually slowing down and stopping the small motor; and then gradually accelerating the larger motor. In this manner an even acceleration of the load from zero to maximum speed is obtained, without disconnecting either motor from the load.

Figure 2:
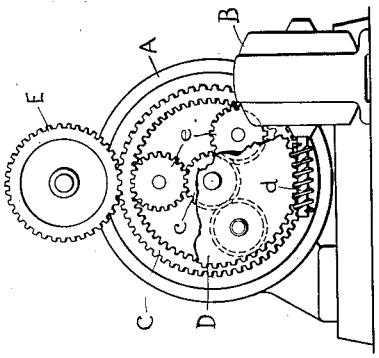
Figure 1:
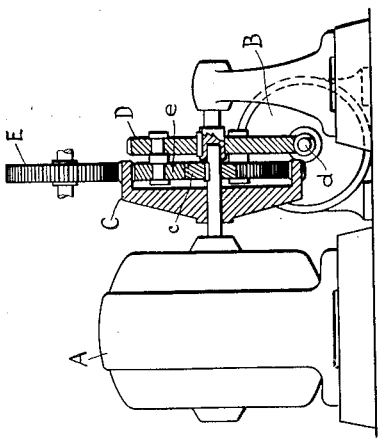

My invention will best be understood by reference to the accompanying drawings, in which Figure 1 shows a side elevation of two motors and gearing arranged in accordance with my invention; Fig. 2 shows an end elevation of the same; and Fig. 3 is a diagram of the circuit connections and control switches.

Referring first to Figs. 1 and 2, A represents a large motor, and B a small motor. The armature of motor A carries fast on its shaft a pinion $c$, which forms one member of a differential gear. A wheel C sleeved on the shaft of motor A is provided with both external and internal gears, the internal gear teeth forming a second member of the differential gear. The motor B carries on its shaft a worm $d$ engaging a worm-wheel D. This worm-wheel is provided with a plurality of studs on which are mounted the pinions $e$, which mesh both with pinion $c$ and with the internal gear teeth on wheel C and form the third member of the differential gear. The external gear on wheel C meshes with the gear E, which is connected to the load. The gearing is so proportioned that when motor A is operating at its minimum speed, and motor B at its maximum speed, the wheel C stands still so that the load-speed is zero. By gradually slowing down the motor B, a gradual acceleration is imparted to the wheel C, and when motor B is brought to rest the pinions $e$ act simply as idlers to transmit power directly from the pinion $c$ to the wheel C. Then by increasing the speed of motor A the speed of the load may be further increased. In slowing down the motor B the load-torque tends to drive motor B as a generator to return power to the line, and if the pitch of the worm is such that torque can be transmitted in both directions, the motor B will actually return a certain amount of power in this manner. If the pitch of the worm is such that power cannot be returned from the gear D to the motor B, the motor B will simply run idle, taking only sufficient power to rotate the worm and allow the worm-wheel to revolve.

Figure 3:
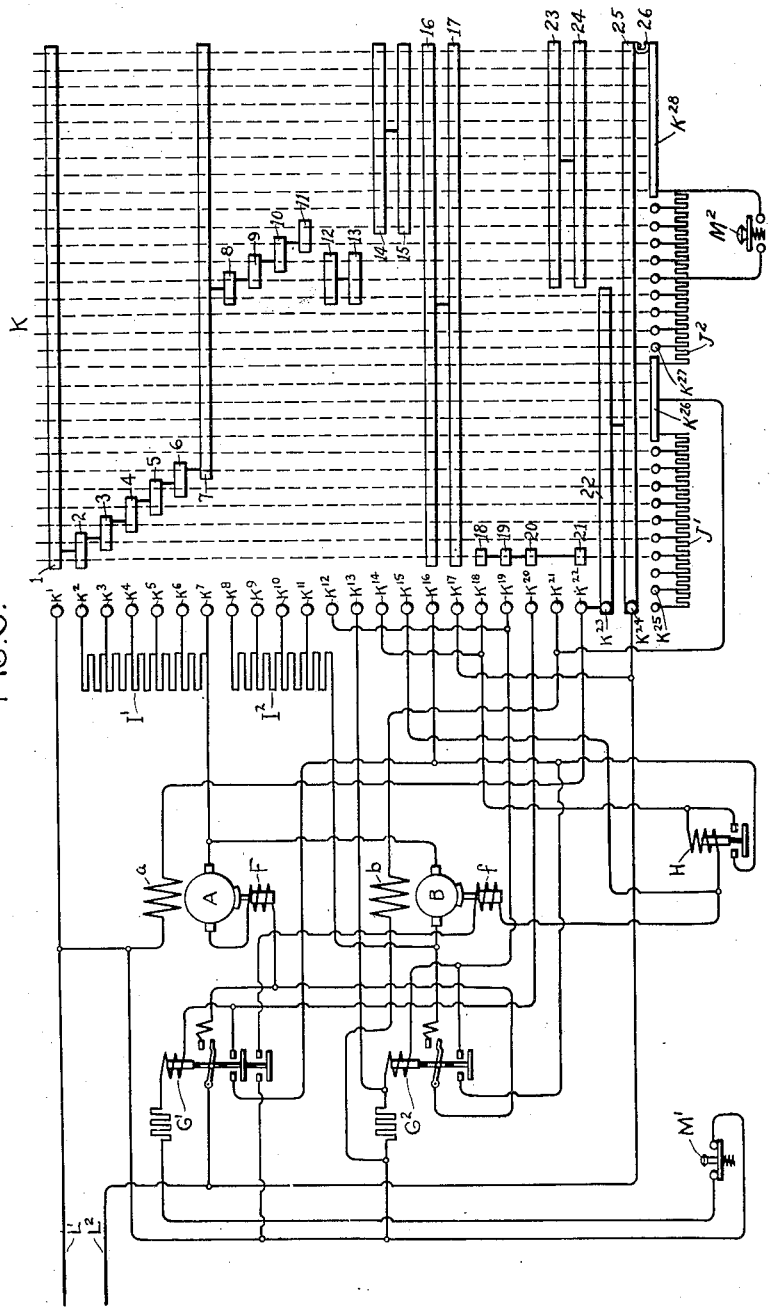

A suitable arrangement of control-circuits is shown in Fig. 3. In this figure the armatures of the two motors are represented by A and B, respectively, and the fields by $a$ and $b$. F and $f$ represent electrically controlled brakes of any well-known type, which, when the magnet-coils are deënergized, are mechanically applied, and which are electrically released. $G^1$ and $G^2$ represent two magnetically actuated switches or contactors for closing the circuits of the motor armatures. H represents a relay, the purpose of which will appear from the following description. $I^1$ and $I^2$ represent armature resistances, and $J^1$ and $J^2$ field resistances. K represents the controlling switch comprising stationary contacts $k^1$ to $k^{28}$, and movable contacts 1 to 26. $L^1$ and $L^2$ represent the line-wires leading from the source of current, and $M^1$ and $M^2$ represent push-buttons, the first of which is normally closed, and the second of which is normally open.

The operation of the switches shown in Fig. 3 is as follows: With the controlling switch K in its off-position, the field-circuits only of the motors are closed. The field-circuit of the larger motor may be traced as follows: line-wire $L^1$, field-winding $a$, contacts $k^{22}$, $k^{23}$, 22, 25, and $k^{24}$, to line-wire $L^2$. The field-winding $a$ is thus connected directly across the line with no resistance in circuit,—in other words, this field is at maximum strength. The circuit of field-winding $b$ may be traced as follows: line-wire $L^1$, winding $b$, contact $k^{26}$, resistance $J^2$, contacts $k^{28}$, 26, 25, and $k^{24}$, to line-wire $L^2$. Field-winding $b$ consequently has all of resistance $J^2$ in series with it, and is consequently at its minimum strength. When switch K is moved into its first running position a circuit is closed as follows: line-wire $L^1$, push-button $M^1$, contactor $G^1$, contacts $k^{20}$, 20, 21, $k^{22}$, $k^{23}$, 22, 25, and $k^{24}$, to line-wire $L^2$. Contactor $G^1$ consequently closes its contacts. A second circuit may be traced as follows: line-wire $L^1$, contactor $G^2$, contacts $k^{19}$, 19, 21, $k^{22}$, $k^{23}$, 22, 25, and $k^{24}$, to line-wire $L^2$. Contactor $G^2$ consequently closes its contacts. It will be noted that each of these contactors, in closing its contacts, closes a maintaining circuit for itself. The maintaining circuit of the contactor $G^1$ extends through its second armature and contacts $k^{16}$, 16, 17, and $k^{17}$, to line-wire $L^2$, while the maintaining circuit for contactor $G^2$ extends through its lower contact and contacts $k^{16}$, 16, 17, $k^{17}$, to line-wire $L^2$. Thus, when contacts 19 and 20 leave contacts $k^{19}$ and $k^{20}$, the contactors $G^1$ and $G^2$ do not drop their contacts. Another circuit, which is closed as soon as contactor $G^1$ picks up its contacts, is as follows: line-wire $L^1$, bottom contacts of contactor $G^1$, brake-coil $f$, relay-winding H, contacts $k^{18}$, 18, 21, $k^{22}$, $k^{23}$, 22, 25, and $k^{24}$, to line-wire $L^2$. Brake-coil $f$ consequently releases motor-armature B and relay H picks up, closing a maintaining-circuit for itself and for shunt-coil F through contacts $k^{16}$, 16, 17, $k^{17}$, to line-wire $L^2$. The armature-circuits are also closed in the first running position of switch K, as follows: line-wire $L^1$, contacts $k^1$, 1, 2, $k^2$, to resistance $I^1$. After passing through this resistance, the current divides, part going through the armature A, brake-coil F, and upper contacts of contactor $G^1$, to line-wire $L^2$; the other part going through armature B, upper contacts of contactor $G^2$ and upper contacts of contactor $G^1$, to line-wire $L^2$. Brake-coil F consequently releases armature A, and the armatures of both motors are connected across the line-wires with all of resistance $I^1$ in series. As the switch K is moved to its second, third, fourth, fifth and sixth positions, no changes are made except that resistance $I^1$ is cut out of circuit step-by-step, so as to bring the motor armatures A and B up to speed. It will be remembered that armature A is operated in full field, and consequently at minimum speed, while armature B is operating in its weakest field, and consequently at maximum speed, so that both at starting and when resistance $I^1$ is entirely cut out, the load driven by the two motors will be stationary, since the gearing is so designed that with armature A at minimum speed and armature B at maximum speed, the load-speed is zero. After resistance $I^1$ is entirely cut out, contact 26, which is carried by the movable part of switch K, and which has been moving along stationary contact strip $k^{28}$, now begins to pass over stationary contacts $k^{27}$, so as gradually to cut resistance $J^2$ out of circuit. This gradually strengthens the field of motor armature B, and slows the armature down, thereby starting the load, as has been already explained. When contact 26 reaches the stationary contact-strip $k^{26}$, the motor-field $b$ is at full strength. When this point is reached movable contacts 12 and 13 engage contact-fingers $k^{12}$ and $k^{13}$, thereby short-circuiting contactor $G^2$ by connecting both terminals of the contactor winding to each other. This contactor consequently drops its contacts, thereby disconnecting motor armature B from the source of current. At the same time motor armature B is short-circuited through the resistance $I^2$, in order to brake this armature electrically. This braking circuit may be traced as follows: from the right-hand brush of armature B, through contacts $k^7$, 7, 8, $k^8$, resistance $I^2$, to left-hand armature brush. As the controlling switch K is moved into the following positions, the resistance $I^2$ is gradually cut out. When armature B has thus been brought to rest, or nearly to rest, the circuit of the brake-coil $f$ is opened by the engagement of contacts 14 and 15 by the contacts $k^{14}$ and $k^{15}$. These two contacts $k^{14}$ and $k^{15}$ are connected to opposite terminals of the relay H, which is consequently short-circuited and drops its contact. The circuit of brake-coil $f$ is consequently opened and the brake is applied, thereby holding armature B stationary. The load is now being driven by the larger motor A alone, which is still operating at its minimum speed.

While the circuit changes described above have been taking place, contact 22 has left contact $k^{23}$, while contacts 23 and 24 have come into engagement with contacts $k^{21}$ and $k^{22}$. This transfers the circuit from the right-hand terminal of field-winding $a$ to contacts $k^{22}$, 24, 23, $k^{21}$, $k^{26}$, 26, 25, and $k^{24}$, to line-wire $L^2$. Contact 26 has been moving over contact $k^{26}$, while motor armature B has been braked, and upon a further movement of the controlling switch K, begins to move over the contacts $k^{25}$ connected to resistance $J^1$. Consequently a further movement of switch K cuts this resistance $J^1$ into circuit with the field-winding A, so as to increase the speed of motor armature A, and further to increase the load-speed.

As has appeared from the above description, the purpose of the relay H is to break the circuit of field-coil $f$ at the proper time.

The purpose of the push-button $M^1$, which is normally closed, is to stop the motors instantaneously at any point in their operation. If this push-button $M^1$ is depressed, the circuit of contactor $G^1$ is broken, so that it drops its armatures, opening the circuits of both motor armatures and both brake-coils. The load is thus brought immediately to rest.

The purpose of the maintaining contacts on the contactors and of the contacts 18, 19, 20 and 21 is to prevent the motors from again starting up until the switch K is brought back to its first running position.

The purpose of the push-button $M^2$ is to impart slow momentary movement to the load at starting, if desired. By depressing this push-button when the controlling switch K is in its starting position, a section of resistance $J^2$ is cut out, so that a certain speed is imparted to the load.

While I have illustrated and described a complete control system applicable to my invention, it will be understood that the particular arrangement of the several controlling switches shown is in no way essential to my invention, and that other suitable arrangements may be employed. Accordingly, I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a load to be driven, two variable-speed electric motors, and a differential gear having two of its members connected to said motors respectively and its third member to the load and arranged to give a load-speed of zero when one motor is operating at its maximum and the other at its minimum speed.

2. In combination with a load to be driven, two variable-speed electric motors of different capacities, and a differential gear having two of its members connected to the two motors respectively and its third member to the load and arranged to give a load-speed of zero when the smaller motor is operating at its maximum and the larger motor at its minimum speed.

3. In combination with a load to be driven, two variable-speed electric motors, a differential gear having two of its members connected to said motors respectively and its third member to the load and arranged to give a load-speed of zero when one motor is operating at its maximum and the other at its minimum speed, and an electrically-controlled brake for one of said gear members.

4. In combination with a load to be driven, two variable-speed electric motors of different capacities, a differential gear having two of its members connected to the two motors respectively and its third member to the load and arranged to give a load-speed of zero when the smaller motor is operating at its maximum and the larger motor at its minimum speed, and an electrically-controlled brake for the gear member connected to the smaller motor.

5. In combination with a load to be driven, two variable-speed electric motors of different capacities, a differential gear having two of its members connected to the two motors respectively and its third member to the load and arranged to give a load-speed of zero when the smaller motor is operating at its maximum and the larger motor at its minimum speed, and controlling means for said motors arranged to bring said motors to their maximum and minimum speeds respectively, then gradually to reduce the speed of the smaller motor and then gradually to increase the speed of the larger motor.

6. In combination with a load to be driven, two variable-speed electric motors of different capacities, a differential gear having two of its members connected to the two motors respectively and its third member to the load, and speed-reducing gearing in the connection between the smaller motor and the differential gear.

7. In combination with a load to be driven, two variable-speed electric motors of different capacities, a differential gear having two of its members connected to the two motors respectively and its third member to the load, speed-reducing gearing in the connection between the smaller motor and the differential gear, and controlling means for said motors arranged to bring the smaller motor to its maximum and the larger motor to its minimum speed, then gradually to reduce the speed of the smaller motor, and then gradually to increase the speed of the larger motor.

8. In combination with a load to be driven, two electric motors of different capacities, resistances for varying the field-strengths of the motors, a differential gear having two of its members connected to the two motors respectively and its third member to the load, and arranged to give a load-speed of zero when the smaller motor is operating with minimum and the larger motor with maximum field-strength and a controlling switch arranged to bring said motors up to speed simultaneously with minimum and maximum field-strengths respectively, then gradually to increase the field-strength of the smaller motor, and then gradually to decrease the field-strength of the larger motor.

9. In combination with a load to be driven, two electric motors of different capacities, resistances for varying the field-strengths of the motors, a differential gear having two of its members connected to the two motors respectively and its third member to the load, and arranged to give a load-speed of zero when the smaller motor is operating with minimum and the larger motor with maximum field-strength, an electrically-controlled brake for the smaller motor, and a controlling switch arranged to bring said motors up to speed simultaneously with minimum and maximum field-strengths respectively, then gradually to increase the field-strength of the smaller motor, then to apply said brake, and then gradually to decrease the field-strength of the larger motor.

10. In combination with a load to be driven, two electric motors of different capacities, resistances for varying the field-strengths of the motors, a differential gear having two of its members connected to the two motors respectively and its third member to the load, and arranged to give a load-speed of zero when the smaller motor is operating with minimum and the larger motor with maximum field-strength, and a controlling switch arranged to bring said motors up to speed simultaneously with minimum and maximum field-strengths respectively, then gradually to increase the field-strength of the smaller motor, then to short-circuit the armature of the smaller motor, and then gradually to reduce the field-strength of the larger motor.

In witness whereof, I have hereunto set my hand this 16th day of October, 1906.

HENRY B. EMERSON.

Witnesses:
BENJAMIN B. HULL,
HELEN ORFORD.